United States Patent
Freiburger et al.

(10) Patent No.: US 8,592,771 B2
(45) Date of Patent: Nov. 26, 2013

(54) PROCEDURES TO MINIMIZE THE ORIENTATION DEPENDENCY OF AUTOMATIC DRIFT COMPENSATION OF A SCINTILLATION COUNTER

(75) Inventors: Ewald Freiburger, Neulingen (DE); Dirk Moermann, Bischweier (DE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 192 days.

(21) Appl. No.: 13/295,580

(22) Filed: Nov. 14, 2011

(65) Prior Publication Data
US 2012/0119093 A1    May 17, 2012

(30) Foreign Application Priority Data
Nov. 15, 2010 (DE) .......................... 10 2010 043 944

(51) Int. Cl.
*G01T 1/20*    (2006.01)
(52) U.S. Cl.
USPC ........................................... 250/362
(58) Field of Classification Search
USPC ........................................... 250/362
See application file for complete search history.

(56) References Cited

U.S. PATENT DOCUMENTS

| | | | |
|---|---|---|---|
| 5,218,202 A | 6/1993 | Evers | |
| 7,180,054 B2 | 2/2007 | Nistor | |
| 2003/0023192 A1* | 1/2003 | Foxlin | 600/595 |
| 2005/0017181 A1* | 1/2005 | Kearfott et al. | 250/361 R |
| 2008/0142718 A1* | 6/2008 | Mormann et al. | 250/361 R |
| 2010/0243878 A1 | 9/2010 | Freiburger et al. | |

FOREIGN PATENT DOCUMENTS

| | | |
|---|---|---|
| DE | 41 14 030 C1 | 9/1992 |
| DE | 42 33 278 C2 | 3/1995 |
| DE | 100 48 559 A1 | 4/2002 |
| EP | 2 237 073 A1 | 10/2010 |
| WO | WO 03/052396 A2 | 6/2003 |

OTHER PUBLICATIONS

German Office Action dated Nov. 2, 2011 with partial English translation {five (5) pages).

* cited by examiner

*Primary Examiner* — Christine Sung
(74) *Attorney, Agent, or Firm* — Crowell & Moring LLP

(57) ABSTRACT

A method of minimizing the orientation dependence of an automatic drift compensation of a scintillation counter having a rod-shaped scintillator is provided. The cosmic radiation energy spectrum is analyzed above a predefined energy threshold value for the automatic drift compensation. A counting rate of particles having an energy deposition in the scintillator greater than an energy threshold value is controlled to a constant desired counting rate value. The method determines a first integral energy spectrum of the cosmic radiation while the scintillator is upright, and a second integral energy spectrum while the scintillator is in a horizontal position. An intersection point of the first and second integral energy spectrums is detected, and the energy threshold value of the drift compensation is set to the energy threshold value pertaining to the intersection point and the desired counting rate value is set to the counting rate pertaining to the intersection point.

6 Claims, 1 Drawing Sheet

PROCEDURES TO MINIMIZE THE ORIENTATION DEPENDENCY OF AUTOMATIC DRIFT COMPENSATION OF A SCINTILLATION COUNTER

BACKGROUND AND SUMMARY OF THE INVENTION

The invention relates to a method of minimizing the orientation dependence of an automatic drift compensation of a scintillation counter.

In the field of process measuring techniques, radiometric measuring systems that comprise scintillation counters or scintillation detectors for radiation measurements are frequently used for measuring process quantities or material properties, for example, for level measuring, moisture measuring, density measuring, etc.

Scintillation counters are used, for example, for determining the spectrum of ionizing radiation, i.e. for determining the intensity as a function of the energy of the ionizing radiation, in which case a scintillation counter comprises a scintillator which is excited during the passage of radiation in the form of high-energy charged particles or photons and emits the excitation energy again in the form of light pulses (usually in the UV- or visible range), which is called scintillation.

The thereby generated light pulses are converted by means of a suitable optical sensor to electrical signals and are amplified. Typically, such a sensor is a photo-electric multiplier or a photodiode. The optical sensor emits pulses, in which case a number of pulses per time unit, i.e. the counting rate, is a measurement of the intensity of the radiation, and a pulse height or pulse amplitude (more precisely, an integral over the time history of the pulse) is a measurement of the energy of the radiation.

For measuring a process quantity in the form of a level in a tank, the tank can, for example, be acted upon on one side by the radiation of a useful radiation source, and an intensity of the radiation can be measured on the opposite side of the useful radiation source by use of a scintillation counter. The measured intensity or counting rate depends on the level in the tank because, when measured goods are present in the beam path, a portion of the radiation will be absorbed by the measured goods; i.e. the level can be determined as a function of the measured counting rate.

However, the measured counting rate is subject to drift effects which may be caused, for example, by temperature fluctuations, aging effects of the scintillator and/or of the photo-electric multiplier and/or drift effects in an electronic analyzing system. These drift effects lead to measuring errors which make a reliable determination of the process quantity difficult or impossible.

A method for the automatic drift compensation of a scintillation counter by using the essentially time-constant cosmic radiation energy spectrum is described, for example, in German Patent Document DE 41 14 030 C1. For the drift compensation, a counting rate of pulses is determined here whose energy or pulse height is above a predefinable energy threshold value selected such that energies of particles which originate from the useful radiation source and whose counting rate is analyzed for determining the measuring quantity, are lower than the energy threshold value. The particles of the useful radiation source therefore do not contribute to the counting rate above the energy threshold value.

In addition to the energy of the observed particle or photon, the generated or measured pulse height also depends on an overall amplification or an overall amplification factor of the scintillation counter, which determines the pulse height when an energy of the particle or photon impinging on the scintillator is given. Among other things, the overall amplification is determined by a level of a high voltage, which acts upon the photo-electric multiplier, and by the amplification of an electronic analyzing system which, from the signal emitted by the photo-electric multiplier, as a result of an analog processing, generates a signal in a level range which is suitable, for example, for the digital analysis by means of a comparator and a microprocessor connected on the output side.

The change of the overall amplification, for example, by changing the high voltage supplying the photo-electric amplifier, causes a change of the spectrum measured by the scintillation counter in the energy direction, whereby the counting rate of particles having an energy greater than the energy threshold value of the drift compensation will change.

Since the energy threshold value is selected such that particles of the useful radiation source, whose pertaining counting rate is a function of the quantity to be measured, do not contribute to the counting rate above the energy threshold value and the counting rate caused by the cosmic radiation is essentially time-constant, for the purpose of the drift compensation, the overall amplification can be controlled such that the counting rate of particles with an energy greater than the energy threshold value will remain constant.

In the case of rod-shaped scintillators, i.e. non-cubical scintillators, however, the counting rate caused by the cosmic radiation is dependent on the orientation of the scintillator relative to the horizontal line, i.e. is a function of whether the rod-shaped scintillator is in a horizontal or upright position.

The flow of cosmic radiation at sea level is typically 1 particle or muon per minute and per $cm^2$ of scintillator surface, with a specific energy loss of approximately 1.7 (MeV $cm^2$)/g. Since the cosmic radiation is partially absorbed in the atmosphere, the cosmic radiation preferably impinges vertically. The angular distribution corresponds essentially to a $cos^2$-function. This has the effect that the counting rate of the particles or muons traversing the scintillator as well as their mean energy deposition (dE/dx) for rod-shaped scintillators is a function of the alignment or orientation of the scintillator relative to the zenith angle.

The counting rate is maximal for a horizontally aligned (i.e. horizontally positioned) scintillator or detector because the projected surface is the largest there. The energy deposition is maximal for a vertically aligned, i.e. upright scintillator because here the particles or muons cover the largest distance in the scintillator An operating point of the above-described cosmic-radiation-based drift compensation is therefore dependent on the alignment or orientation of the scintillator or detector. Depending on the rod length and the measuring task, this may lead to worsened measuring characteristics of the scintillation counter, for example, as a result of increased noise caused by an overall amplification set too high.

It is therefore an object of the invention to provide a method of minimizing the above-mentioned orientation dependence of an automatic drift compensation of a scintillation counter having a rod-shaped scintillator, whose drift compensation is based on the drift compensation described in German Patent Document DE 41 14 030 C1.

This and other objects are achieved by a method of minimizing the orientation dependence of an automatic drift compensation of a scintillation counter having a rod-shaped scintillator. In the method, the cosmic radiation energy spectrum is analyzed above a predefined energy threshold value for the automatic drift compensation in that a counting rate of particles having an energy greater than an energy threshold value is controlled by a suitable setting of an overall amplification to a constant desired counting rate value. In this case, the overall amplification forms the actuating variable of the control. For setting the overall amplification, for example, a level of a high-voltage supply of a photo-electric multiplier optically coupled with the scintillator can be changed, and/or an amplification factor of an electric amplifier, which amplifies pulses coupled out of photo-electric multiplier, can be changed. The following steps are carried out for minimizing the orientation dependence: Determining a first integral energy spectrum of the cosmic radiation by the scintillation counter while the scintillator is upright, i.e. at a zenith angle of 0°; determining a second integral energy spectrum of the cosmic radiation by the scintillation counter while the scintillator is in a horizontal position, i.e. at a zenith angle of 90°; detecting a point of intersection of the first and of the second integral energy spectrums; setting the energy threshold value of the drift compensation to the energy threshold value pertaining to the point of intersection; and setting the desired counting rate value of the drift compensation to the counting rate pertaining to the point of intersection. For determining the first and the second integral energy spectrums of the cosmic radiation, as a function of a variable energy threshold value (X-axis), the counting rate (Y-axis) of particles or muons is determined whose energy is greater than the variable energy threshold value. Because of the selection according to the invention of the energy threshold value and of the desired counting rate value, i.e. of the operating point, of the drift compensation in the point of intersection of the two integral energy spectrums, the drift compensation is independent of the orientation of the detector.

In a further development, the scintillator is a plastic scintillator.

In a further development, a counting rate of particles generated or emitted by a useful radiation source is measured for determining a measured quantity.

In a further development, the scintillator is coupled with an optical sensor which converts light pulses generated by particles in the scintillator to electric signals.

In a further development, the electric signals are electrically amplified by way of a variable amplification factor, in which case the amplification factor is changed, as the actuating variable of the control, for controlling the counting rate of particles having an energy greater than an energy threshold value to a constant desired counting rate value.

In a further development, the optical sensor is a photoelectric multiplier supplied with a high voltage, in which case the high voltage is changed, as the actuating variable of the control, for controlling the counting rate of particles having an energy greater than an energy threshold value to a constant desired counting rate value.

BRIEF DESCRIPTION OF THE DRAWINGS

Embodiments of the invention are schematically illustrated in the drawings and will be explained in detail in the following.

DETAILED DESCRIPTION OF THE DRAWINGS

Figure 1:
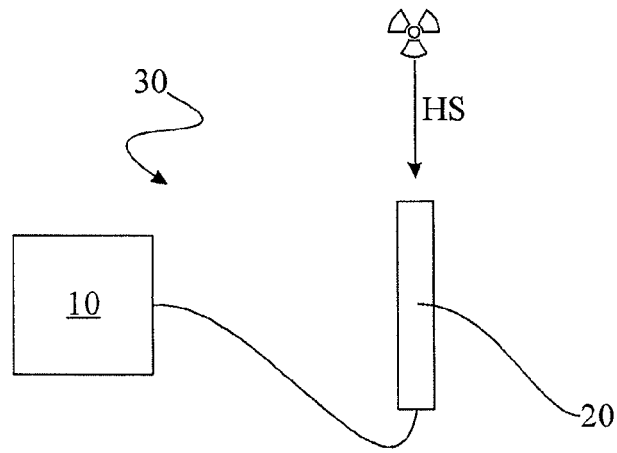
FIG. 1 is a view of a scintillation counter with an upright rod-shaped scintillator.

FIG. 1 illustrates a scintillation counter 30 with a conventional upright rod-shaped plastic scintillator 20 which is connected to an analyzing device 10. The plastic scintillator 20, for example, has a length of one meter or more with a cross-section of, for example, 10 cm×10 cm. It is understood that additional conventional, not shown, elements are present, such as a photo-electric multiplier optically coupled with the plastic scintillator 20, an adjustable high-voltage supply for the photo-electric multiplier, an electric amplifying circuit with an adjustable amplification factor for the amplification of pulses coupled out of the photo-electric multiplier, a microprocessor-based control, a display, etc.

The analyzing device 10 or its microprocessor-based control carries out an automatic cosmic-radiation-based drift compensation in that a counting rate, which is caused by particles or muons that emit energy in the scintillator greater than an energy threshold value detected according to the invention, is controlled to a constant desired counting rate value determined according to the invention in that the overall amplification of the scintillation counter 30 is set as an actuating variable in a suitable manner.

For setting the overall amplification, a level of the high-voltage supply of the photo-electric multiplier can be changed and/or the amplification factor of the electric amplifier can be changed. In addition, reference is also made to German Patent Document DE 41 14 030 C1 with respect to the drift compensation, which document to this extent is expressly incorporated by reference herein.

Figure 2:
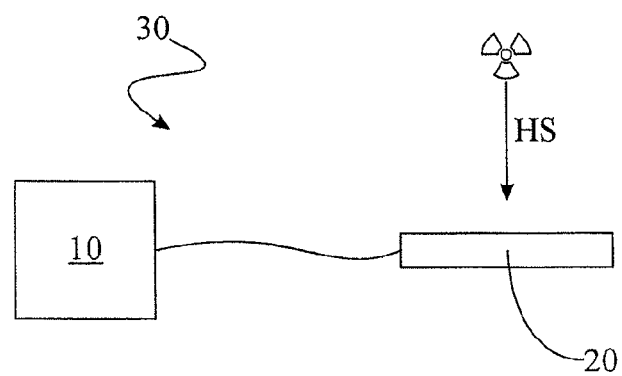
FIG. 2 is a view of the scintillation counter of FIG. 1 with a horizontally disposed scintillator.

FIG. 2 shows the scintillation counter 30 from FIG. 1 with a horizontally disposed scintillator 20. Furthermore, the scintillation counters illustrated in FIGS. 1 and 2 are identical.

Figure 3:
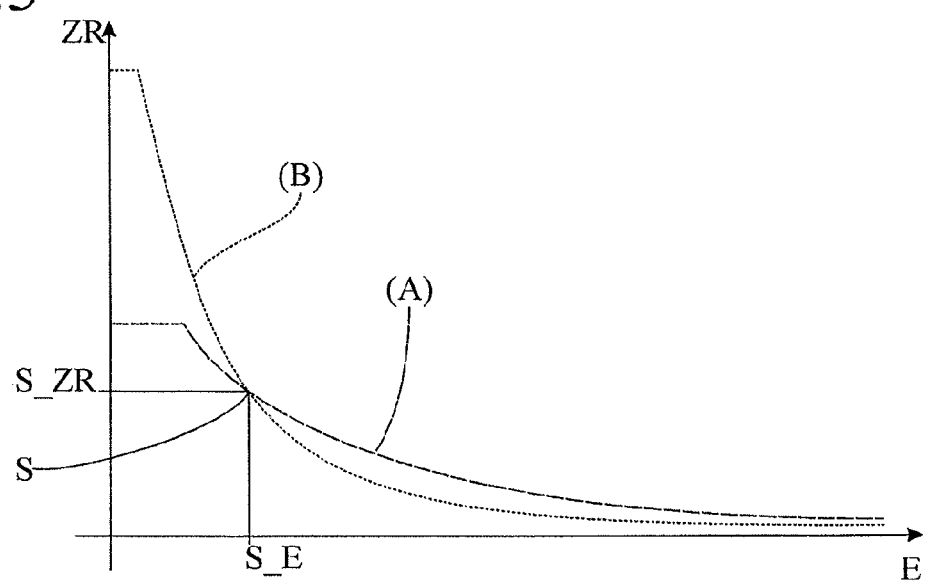
FIG. 3 is a view of a first integral energy spectrum of cosmic radiation that had been determined by use of the scintillation counter of FIG. 1 with an upright scintillator, and of a second integral energy spectrum of cosmic radiation that had been determined by use of the scintillation counter of FIG. 2 with a horizontally disposed scintillator.

FIG. 3 illustrates a first integral energy spectrum (A) of cosmic radiation HS that had been determined by the scintillation counter of FIG. 1 with an upright scintillator, and a second integral energy spectrum (B) of cosmic radiation (HS) that had been determined by the scintillation counter of FIG. 2 with a horizontally disposed scintillator. For determining the two integral energy spectrums, as a function of variable energy threshold values E, which are plotted on the X-axis, those counting rates ZR of particles or muons are determined whose energy output in the scintillator is greater than the actual energy threshold value.

The two integral energy spectrums mutually intersect at a point of intersection S. An energy threshold value S_E and a counting rate S_ZR pertain to the point of intersection S.

The drift compensation is now parameterized such that the energy threshold value of the drift compensation is set to the S_E value and the desired counting rate value is set to the S_ZR value.

The overall amplification as the actuating variable of the drift compensation control is therefore adjusted such that the counting rate of particles whose energy is greater than S_E is equal to S_ZR.

The determination of the two integral energy spectrums (A) and (B) can take place by way of a predefined standard value for the overall amplification.

The illustrated embodiments reliably minimize or eliminate the orientation dependence of the automatic drift compensation when rod-shaped scintillators are used.

The invention claimed is:
1. A method of minimizing orientation dependence of an automatic drift compensation of a scintillation counter having a rod-shaped scintillator, a cosmic radiation energy spectrum being analyzed above a predefined energy threshold value for the automatic drift compensation in that a counting rate of particles having an energy deposition in the scintillator greater than an energy threshold value is controlled to a constant desired counting rate value, the method comprising the acts of:
- determining a first integral energy spectrum of the cosmic radiation by using the scintillation counter while the scintillator is in an upright position;
- determining a second integral energy spectrum of the cosmic radiation by using the scintillation counter while the scintillator is in a horizontal position;
- detecting a point of intersection of the first and of the second integral energy spectrums;
- setting the energy threshold value of the drift compensation to the energy threshold value pertaining to the point of intersection; and
- setting the desired counting rate value of the drift compensation to the counting rate pertaining to the point of intersection.

2. The method according to claim 1, wherein the scintillator is a plastic scintillator.

3. The method according to claim 1, wherein a counting rate of particles generated by a useful radiation source is measured for determining a measured quantity.

4. The method according to claim 1, wherein the scintillator is coupled with an optical sensor which converts light pulses generated by particles in the scintillator to electric signals.

5. The method according to claim 4, wherein:
- the electric signals are electrically amplified by a variable amplification factor; and
- the amplification factor is changed for controlling the counting rate of particles having an energy greater than an energy threshold value to a constant desired counting rate value.

6. The method according to claim 4, wherein:
- the optical sensor is a photo-electric multiplier supplied with a high voltage; and
- the high voltage is changed for controlling the counting rate of particles having an energy greater than an energy threshold value to a constant desired counting rate value.

* * * * *